United States Patent
Mizutani

(10) Patent No.: US 10,884,686 B2
(45) Date of Patent: Jan. 5, 2021

(54) COMPUTER-READABLE STORAGE MEDIUM FOR INFORMATION PROCESSING APPARATUS HAVING SELECTABLE PROCESSING CHANNELS AND A DISPLAY CAPABLE OF DISPLAYING APPLICABLE OPTIONS FOR PRINT SETTINGS

(71) Applicant: Brother Kogyo Kabushiki Kaisha, Nagoya (JP)

(72) Inventor: Aiko Mizutani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/832,186

(22) Filed: Mar. 27, 2020

(65) Prior Publication Data

US 2020/0225894 A1    Jul. 16, 2020

Related U.S. Application Data

(63) Continuation of application No. 16/143,993, filed on Sep. 27, 2018, now Pat. No. 10,649,707.

(30) Foreign Application Priority Data

Sep. 28, 2017    (JP) .................................. 2017-187867

(51) Int. Cl.
*G06F 3/12* (2006.01)
*H04N 1/00* (2006.01)

(52) U.S. Cl.
CPC .......... *G06F 3/1258* (2013.01); *G06F 3/1204* (2013.01); *G06F 3/1205* (2013.01); *G06F 3/1208* (2013.01); *H04N 1/00352* (2013.01)

(58) Field of Classification Search
None
See application file for complete search history.

(56) References Cited

U.S. PATENT DOCUMENTS 6,798,530 B1    9/2004  Buckley et al.
8,094,332 B2 ‡  1/2012  Nakamura
(Continued)

FOREIGN PATENT DOCUMENTS

JP    2007-133636 A  ‡  5/2007
JP    2007-133636 A     5/2007
(Continued)

*Primary Examiner* — Lennin R RodriguezGonzalez
(74) *Attorney, Agent, or Firm* — Banner & Witcoff, Ltd.

(57) ABSTRACT

A non-transitory computer readable storage medium storing computer readable instructions that are executable by a computer in an information processing apparatus connected with a printer, is provided. The computer readable instructions cause the computer to obtain a type of an object contained in an image file, determine whether the obtained type of the object falls under a first type, and based on a determination that the obtained type of the object falls under the first type, determine a combination of applicable options for a print setting for the image file to be a first option group, and based on a determination that the obtained type of the object falls under a second type, determine a combination of applicable options for the print setting for the image file to be a second option group containing a smaller number of applicable options than the first option group.

10 Claims, 10 Drawing Sheets

(56) References Cited

U.S. PATENT DOCUMENTS

2006/0279783 A1   12/2006  Kato
2007/0216925 A1‡   9/2007  Nakamura

FOREIGN PATENT DOCUMENTS

JP       2007-249859 A  ‡  9/2007
JP       2007-249859 A     9/2007

‡ imported from a related application

FIG. 5

Number of Copies

1

Numbering

Count 1

Cutting Option
- ☐ Auto-cut
- ☑ Half-cut
- ☐ Chain-printing
- ☐ Special tape

ABC|ABC

Advanced Setting

Cancel

Print

551 — Print Quality
- ⦿ Priority on speed, 300 by 300 dpi
- ○ Priority on quality, 300 by 300 dpi
- ○ High resolution, 300 by 600 dpi

552 — Print Start
- ⦿ Start printing as soon as the printer starts receiving data.
- ○ Start printing when the printer receives data for one page.

553 — Halftone
- ○ Optimized for logo/text
- ○ Optimized for text/graphic
- ⦿ Optimized for general label including image

554 — Brightness / Contrast (sliders)

555 — ☑ Bidirectional Communication

56 — OK

COMPUTER-READABLE STORAGE MEDIUM FOR INFORMATION PROCESSING APPARATUS HAVING SELECTABLE PROCESSING CHANNELS AND A DISPLAY CAPABLE OF DISPLAYING APPLICABLE OPTIONS FOR PRINT SETTINGS

CROSS REFERENCE TO RELATED APPLICATION

This application is a continuation of U.S. patent application Ser. No. 16/143,993 filed Sep. 27, 2018 which claims priority from Japanese Patent Application No. 2017-187867, filed on Sep. 28, 2017, the entire subject matter of which is incorporated herein by reference.

BACKGROUND

Technical Field

An aspect of the present disclosure is related to a computer-readable storage medium storing a program to be installed in an information processing apparatus, which is capable of communicating with a printer. Specifically, the present disclosure is related to a technic to determine a setting option selectable through a user interface in the information processing apparatus.

Related Art

An information processing apparatus capable of communicating with another device, such as a printer, may process data according to various types of settings and may accept the settings for processing the data through a user interface provided by an application program or a printer driver. Between the information processing apparatus and the device, a plurality of processing channels to process the data there-through may be established. For example, an information processing apparatus may analyze whether print data was generated through a processing channel composed of Win32 application program and GDI (Graphic Device Interface) printer driver or through a processing channel composed of WinFX application program and XPS (WML Paper Specification) printer driver, and the information processing apparatus may accept different settings depending on the processing channel.

SUMMARY

While some print settings to print an image may provide a plurality of applicable options, some of the applicable options may not work effectively in a printed image depending on, for example, a content of the image. Meanwhile, a quantity of the applicable options in each print setting may be fixed or invariable to each user interface. Therefore, the applicable options may be presented to a user regardless of the ineffectiveness in the printed image, and the user may select an applicable option, which may not be substantially effective, without knowing the ineffectiveness. While a larger quantity of setting options may widen a range of latitude in the settings, if the larger quantity of setting options include setting options that are less effective to the user, appearance of a setting screen in a display may become complicated, and the user may find it difficult to select a preferable setting options among the large quantity of applicable options.

The present disclosure is advantageous in that a computer readable storage medium storing computer readable instructions to cause an information processing apparatus to provide a user interface, through which a user may select a print setting easily, is provided.

According to an aspect of the present disclosure, a non-transitory computer readable storage medium storing computer readable instructions that are executable by a computer in an information processing apparatus, having a communication interface, through which the information processing apparatus is connected with a printer, is provided. The computer readable instructions, when executed by the computer, cause the computer to obtain a type of an object contained in an image file; determine whether the obtained type of the object falls under a first type; and based on a determination that the obtained type of the object falls under the first type, determine a combination of applicable options for print settings for the image file to be a first option group, and based on a determination that the obtained type of the object falls under a second type being different from the first type, determine a combination of applicable options for the print settings for the image file to be a second option group, the second option group containing a smaller number of applicable options than the first option group.

BRIEF DESCRIPTION OF THE ACCOMPANYING DRAWINGS

FIG. 5 is an illustrative view of a basic setting screen to be displayed in the information processing apparatus according to the embodiment of the present disclosure.

FIG. 6 is an illustrative view of an advanced setting screen to be displayed in the information processing apparatus s according to the embodiment of the present disclosure.

DETAILED DESCRIPTION

Hereinafter, with reference to the accompanying drawings, described below will be a printing system 100 as an embodiment of the present disclosure.

Figure 1:
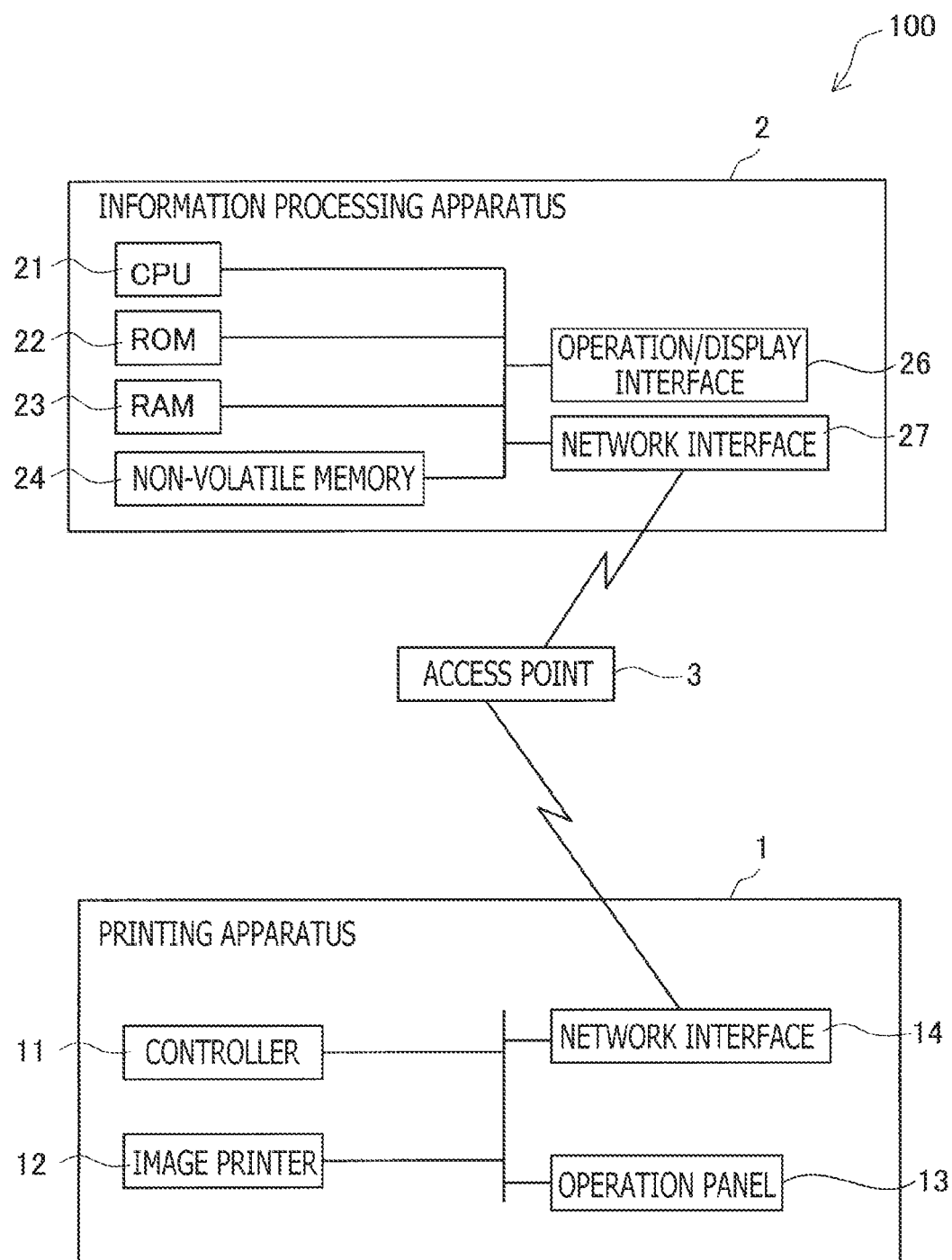
FIG. 1 is a block diagram to illustrate a printing system according to an embodiment of the present disclosure.

The printing system 100 according to the embodiment includes, as shown in FIG. 1, a printing apparatus 1 and an information processing apparatus 2 that may communicate with each other. The printing apparatus 1 may print an image on a printable medium and may include, for example, a label printer, a page printer, a copier, and a multifunction peripheral device. The information processing apparatus 2 may generate and edit image data for the image to be printed in the printing apparatus 1, and transmit a print execution command and the image data to the printing apparatus 1. The information processing apparatus 2 may include, for example, a smartphone, a personal computer, and a tablet computer. The printing apparatus 1 and the information processing apparatus 2 in the printing system 100 may not necessarily be limited to a single printing apparatus 1 and a single information processing apparatus 2, respectively, but may include a plurality of printing apparatuses 1 and a plurality of information processing apparatuses 2, respectively.

The printing apparatus 1 includes, as shown in FIG. 1, a controller 11, an image printer 12, an operation panel 13, and a network interface 14. The controller 11 includes a CPU and a memory and may control devices and parts in the printing apparatus 1. The controller 11 drawn as a single piece of hardware controller in FIG. 1 may not necessarily be limited to a single piece of hardware controller but may include a plurality of hardware devices that may collectively control the printing apparatus 1.

The image printer 12 may print an image on a printable medium in an image forming technic, which may be, for example, an electro-photographic technic or an inkjet printing technic. The operation panel 13 may include, for example, a touch panel, which may accept a user's input and display information. The operation panel 13 may include indicator lamps and buttons. The network interface 14 is a hardware device to establish communication with the information processing apparatus 2.

The information processing apparatus 2 includes, as shown in FIG. 1, a CPU 21, a ROM 22, a RAM 23, a non-volatile memory 24, an operation/display interface 26, and a network interface 27. The ROM 22 may store programs including an activation program to activate the information processing apparatus 2. The RAM 23 may be used as a work area for processing data and as a temporary memory area to store data temporarily. The non-volatile memory 24 may be, for example, an HDD and a flash memory, and store programs and data therein.

The CPU 21 may process information according to programs read from the ROM 22 and the non-volatile memory 24. The operation/display interface 26 may include, for example, a touch panel, which may accept a user's input and display information. The operation/display interface 26 may include, for example, a keyboard, a mouse, and a display. The network interface 27 is a hardware device to establish communication with the printing apparatus 1.

In the printing system 100, the information processing apparatus 2 and the printing apparatus 1 may communicate with each other wirelessly in conformity with Wi-Fi (registered trademark) standard through a common access point 3. In this regard, the network interfaces 14, 27 are interfaces that enable wireless communication in conformity with the Wi-Fi standard, more specifically, with IEEE 802.11 standard or other standards in compliance with IEEE 802.11. However, the technology to establish wireless communication between the information processing apparatus 2 and the printing apparatus 1 may not necessarily be limited to the Wi-Fi standard. For example, the information processing apparatus 2 and the printing apparatus 1 may wirelessly communicate with each other through direct connection without communicating through the access point 3.

Figure 2:
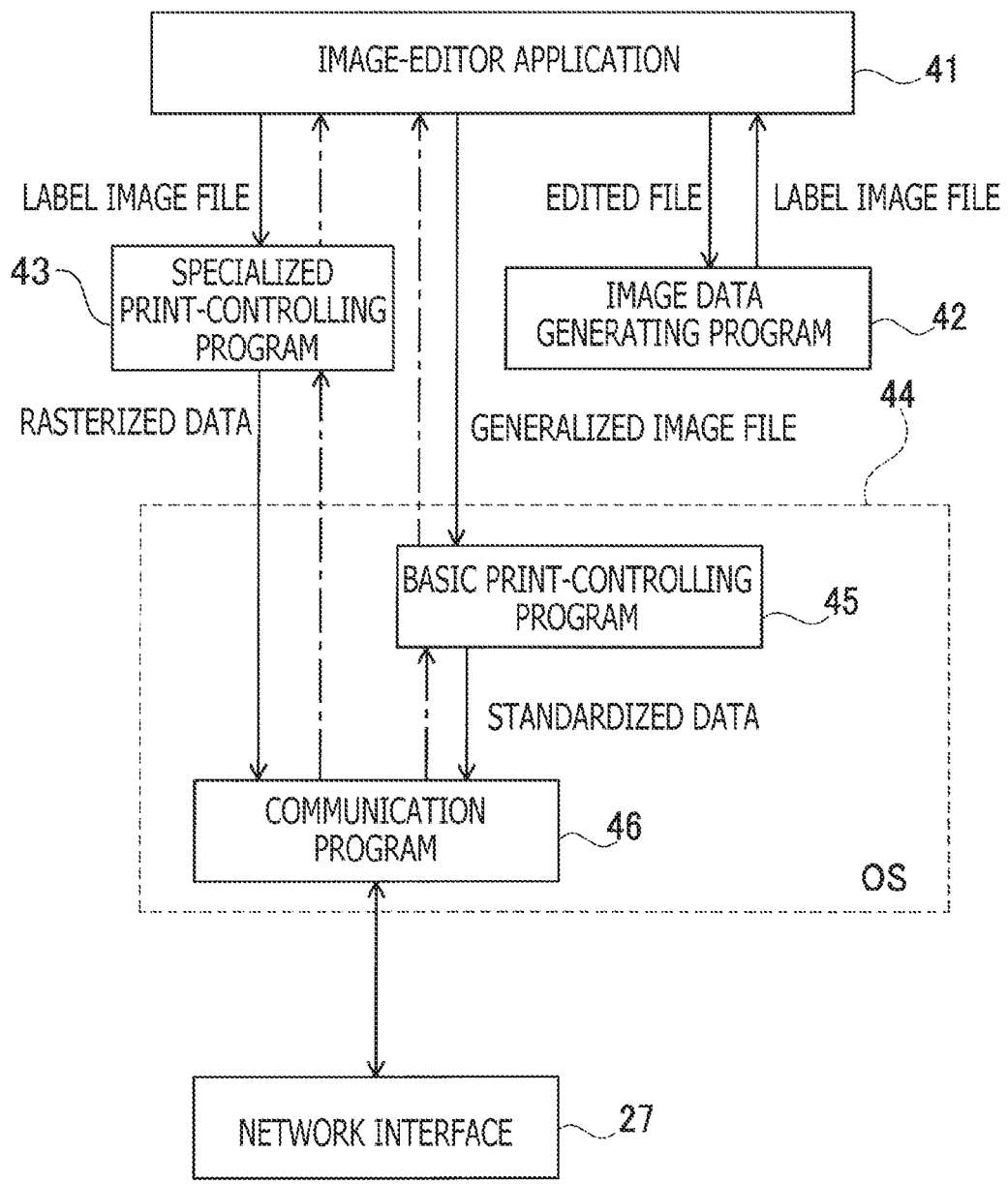
FIG. 2 is a block diagram to illustrate printing programs in an information processing apparatus in the printing system according to the embodiment of the present disclosure.

The non-volatile memory 24 in the information processing apparatus 2 stores, as shown in FIG. 2, an image-editor application 41 being an application program for editing images, an image data creating program 42, a specialized print-controlling program 43, an operating system (OS) 44. The OS 44 for the information processing apparatus 2 includes a basic print-controlling program 45 and a communication program 46. In the following paragraphs, an application program may be referred to as an application. In FIG. 2, directions of data flows from one program to another program are indicated by solid arrows.

The image-editor application 41 is a program having functions to, for example, accept commands from a user, display an image, and edit and save the image. The image-editor application 41 may, for example, generate and edit a label image file to be used in a label printer. The label image file may be a data file to print an image on a label medium, which may be a strip of tape. The image-editor application 41 further has functions to read a generated label image file, accept a print command, and accept setting options for printing an image.

The image-editor application 41 further has a function to obtain status information from the printing apparatus 1 through the specialized print-controlling program 43 or the basic print-controlling program 45, as indicated by dash-and-dot lines in FIG. 2. The status information may include, for example, a print completion report and an error report.

The image data generating program 42 is a program having a function to create an image file for an image to be printed. The image data generating program 42 in the information processing apparatus 2 may, for example, create the label image file according to a command entered through the image-editor application 41. A procedure for the image-editor application 41 to generate the label image file may include, for example, outputting a command to the image data generating program 42 to create a label image file and receiving the created label image file from the image data generating program 42.

The specialized print-controlling program 43 is a program having functions to, for example, generate rasterized data, by rasterizing image data contained in the label image file, and control the communication program 46 to transmit the generated rasterized data to the printing apparatus 1. The specialized print-controlling program 43 may be designed to specifically control a printing apparatus in a specific model. Therefore, the specialized print-controlling program 43 may not control a printing apparatus in a different model from a different manufacturer.

The specialized print-controlling program 43 is a specialized program to control the printing apparatus 1 and may cope with more advanced or detailed print settings, which are applicable to image processing for printing the image in the printing apparatus 1. The specialized print-controlling program 43 may generate rasterized data in a format, which is feasible to the printing apparatus 1. The specialized print-controlling program 43 may be a common program, which are commonly usable not only by the image-editor application 41 but are usable among a plurality of printing applications.

The basic print-controlling program 45 is a program having functions to generate standardized data for printing in conformity with a predetermined printing standard and control the communication program 46 to transmit the generated standardized data to the printing apparatus 1. The basic print-controlling program 45 is a basic program provided by the OS 44. The standardized data transmitted by the basic print-controlling program 45 may be data in conformity with a general rasterization standard, which is feasible to the printing apparatus 1, and is not rasterized.

The basic print-controlling program 45 is a general program designed to run on a variety of printing apparatuses that support a predetermined printing standard. In other words, as long as the printing apparatus has a functionality to cope with the basic print-controlling program 45, the printing apparatus may print an image by the standardized data regardless of a model or a manufacturer of the printing apparatus. Meanwhile, due to the versatility of the basic print-controlling program 45 to cope with the variety of printing apparatuses, print setting options applicable through the basic print-controlling program 45 may be limited to basic settings. Therefore, the basic print-controlling program 45 may not always accept the print setting options that are feasible to the printing apparatus 1. Printing systems utilizing the basic print-controlling program 45 may include, for example, AirPrint (registered trademark) and Mopria (registered trademark).

In this regard, the label image file created by the image data generating program 42 may be more preferably processed by the specialized print-controlling program 43. The image-editor application 41 may transfer image data of an image to be printed to either the specialized print-controlling program 43 or the basic print-controlling program 45. When the image data is transferred to the specialized print-controlling program 43, the image-editor application 41 may transfer the label image file and apply all of the commanded print setting options to the label image data. Meanwhile, when the image data is transferred to the basic print-controlling program 45, the image-editor application 41 may transfer a data file, in which the label image file is converted into a generally usable format, to the basic print-controlling program 45, with merely the basic print setting options applied thereto.

The communication program 46 is a program having a function to control the network interface 27 to communicate with another communication device. For example, the specialized print-controlling program 43 may register the generated rasterized data in a spooler in the OS 44. The communication program 46 in the information processing apparatus 2 may transmit the data registered in the spooler to the printing apparatus 1 through the network interface 27. The communication program 46 is another one of basic programs provided by the OS 44. A part of the communication program 46 may be stored in the ROM 22.

Figure 3:
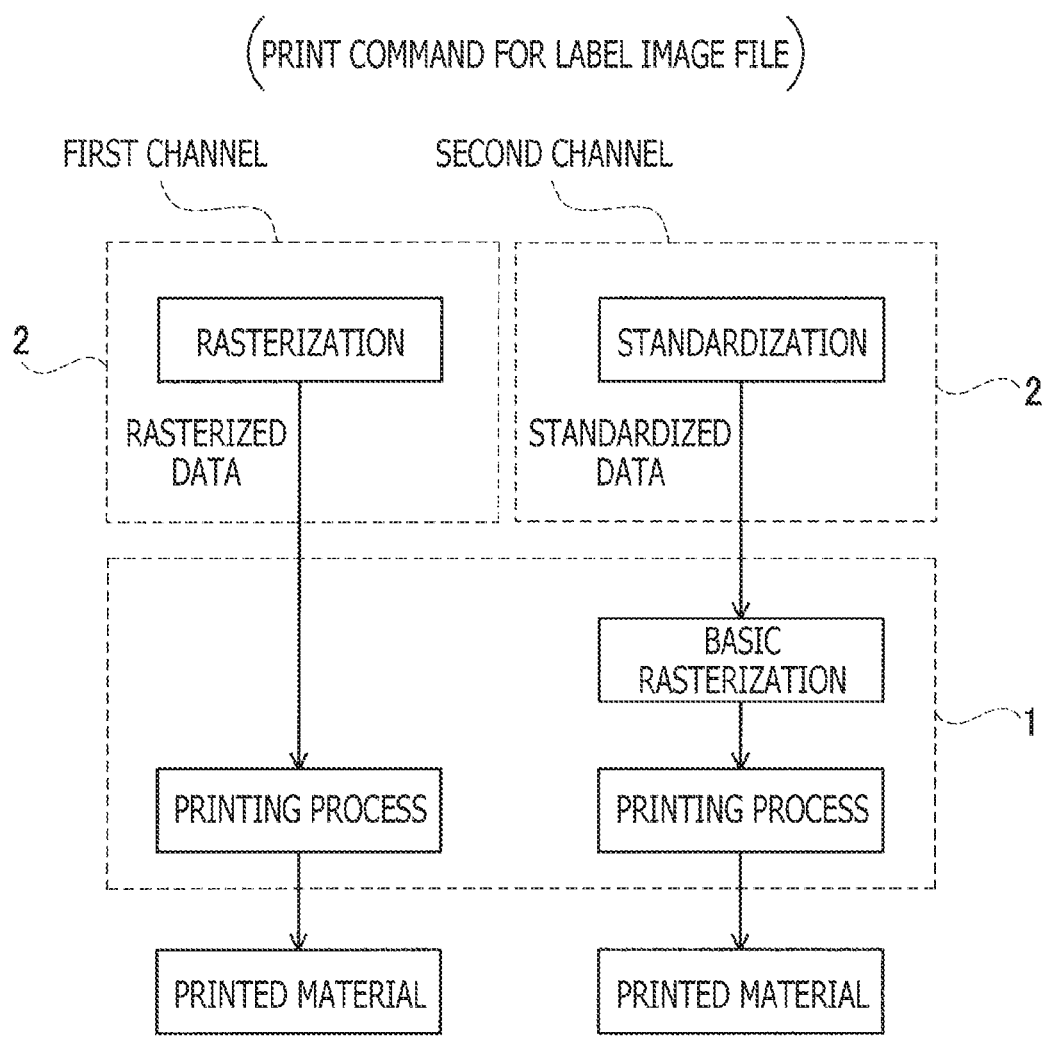
FIG. 3 is a block diagram to illustrate processing channels for the information processing apparatus in the printing system according to the embodiment of the present disclosure.

The printing system 100 may have, as indicated in FIG. 3, two (2) processing channels to cause the printing apparatus 1 to print an image. The processing channels include a first channel, in which the information processing apparatus 2 may rasterize the image data, and a second channel, in which the printing apparatus 1 may rasterize the image data.

In order to control the printing apparatus 1 to print the image through the first channel, the information processing apparatus 2 may, as shown in FIG. 3, rasterize the image data contained in the label image file in a rasterization process and transmit the rasterized data to the printing apparatus 1. The printing apparatus 1 may receive the rasterized data and print the image based on the rasterized data having been received. Through the first channel, the information processing apparatus 2 rasterizes the image data for the image to be printed by the specialized print-controlling program 43 shown in FIG. 2.

Through the first channel, the data is processed by the specialized print-controlling program 43, which is feasible to the print settings that are applicable to the printing apparatus 1. While the specialized print-controlling program 43 is not provided by the OS 44, in order to print the image through the first channel, the information processing apparatus 2 may not use print-controlling functions (e.g., the basic print-controlling program 45) contained in the OS 44.

In order to control the printing apparatus 1 to print the image through the second channel, the information processing apparatus 2 may, as shown in FIG. 3, standardize the image data contained in the label image file in a standardization process and transmit the standardized data to the printing apparatus 1. The printing apparatus 1 may receive the standardized data, rasterize the standardized data in a general rasterization process, and print an image based on the rasterized data having been rasterized. Through the second channel, the information processing apparatus 2 standardizes the image data of the image to be printed by the basic print-controlling program 45 shown in FIG. 2.

Through the second channel, the data is processed by the basic print-controlling program 45, which is the print-controlling function included in the OS 44. In this regard, some of the print settings applicable to the printing apparatus 1 may not be feasible to the basic print-controlling program 45. For example, the basic print-controlling program 45 may not be adapted to handle image data in a high resolution, which may only be adaptable to a specific model of printing apparatus. Therefore, in order to print the image through the second channel, a resolution adaptable to majority of models, i.e., a print setting other than the high resolution, may be applied.

Thus, the first channel and the second channel differ in the subjects to process the image data of the image to be printed. Namely, through the first channel, it is the information processing apparatus 2 that rasterizes the image data. On the other hand, through the second channel, it is the printing apparatus 1 that rasterizes the image data. In other words, the first channel is a channel, in which the information processing apparatus 2 rasterizes the image data, and the second channel is a channel, in which the printing apparatus 1 rasterizes the image data. Further, the first channel and the second channel may differ in algorisms to rasterize the image data and in outcomes of the rasterization. In other words, in the first channel, more advanced or detailed print settings may be applicable to the rasterization, while in the second channel some of the print settings may be limited in the rasterization. Furthermore, the first channel and the second channel may differ in types and formats of the data to be transmitted from the information processing apparatus 2 to the printing apparatus 1. Therefore, while images may be printed based on a same label image file, an image as a printed outcome through the first channel and an image as a printed outcome through the second channel may not be the same but may appear differently.

In the present embodiment, the printing apparatus 1 in the printing system 100 is adapted to print both an image based on the rasterized data transmitted through the first channel and an image based on the standardized data transmitted through the second channel. Meanwhile, the information processing apparatus 2 is adapted to transmit data to the printing apparatus 1 through either the first channel or the second channel by the wireless communication through the network interface 27. Therefore, the printing system 100 is adapted to process image data through both the first channel and the second channel.

Next, in the following paragraphs, described will be flows of printing actions to be performed in the printing system 100 according to the present embodiment. More specifically, a printing process through the first channel in the printing system 100 will be described. In the embodiment described below, the printing apparatus 1 is described as a label printer capable of printing multicolored images. The image-editor application 41 may be a program to generate a label image file to be used in the label printer. The specialized print-controlling program 43 may be a program to generate rasterized data adapted to be usable in the label printer. In the printing process through the first channel, the information processing apparatus 2 may accept advanced settings feasible to the printing apparatus 1.

Figure 4:
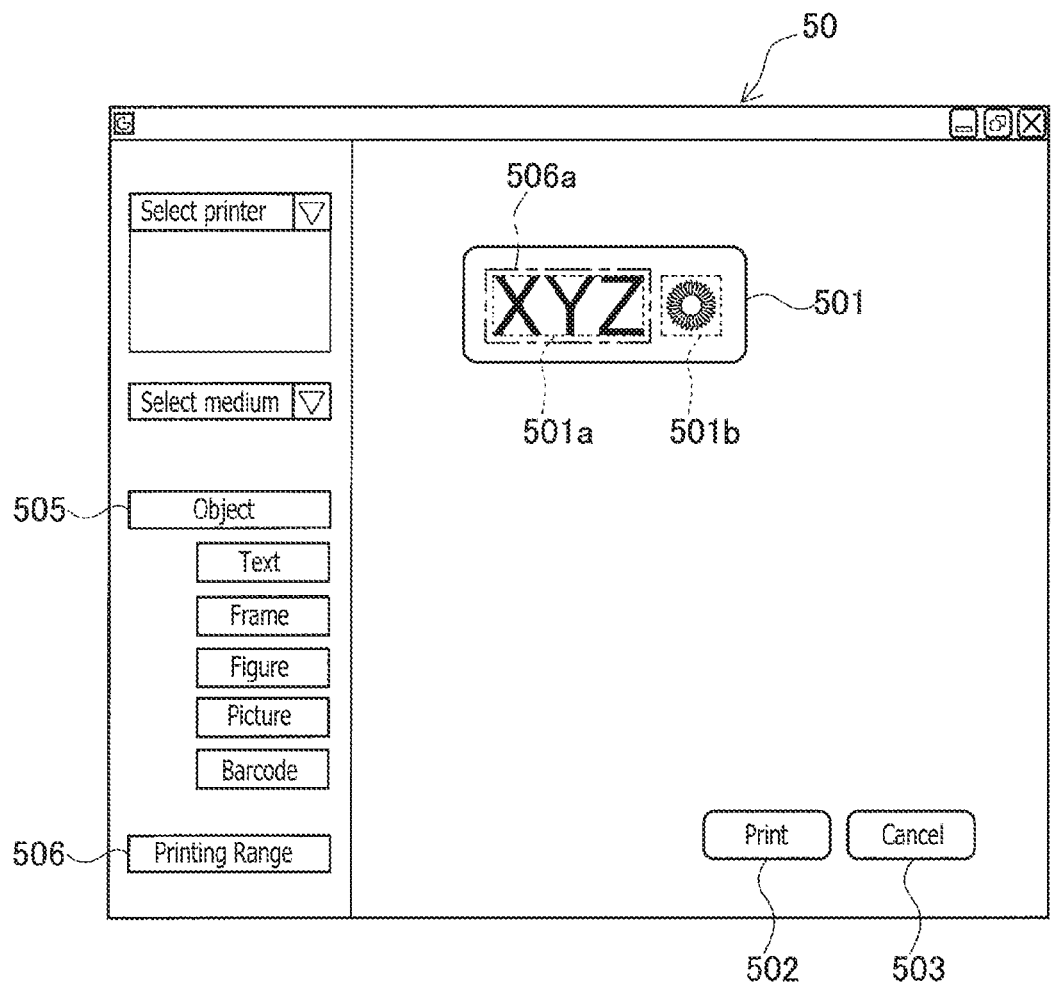
FIG. 4 is an illustrative view of an editor screen to be displayed in the information processing apparatus according to the embodiment of the present disclosure.

In order to create a label in the printing system 100, a user may operate the information processing apparatus 2 to execute the image-editor application 41 and edit a label image file containing image data for an image to be printed. The information processing apparatus 2 may activate the image-editor application 41 and display an editor screen 50 as shown in FIG. 4 in the operation/display interface 26. The editor screen 50 may contain, for example, a preview image 501, which expresses a label image being currently edited, a print button 502, through which a command to print the label image may be entered, and a cancel button 503, through which actions to edit the label image may be canceled.

The editor screen 50 may further include, for example, an object selection button 505, as shown in FIG. 4. Through the object selection button 505, the information processing apparatus 2 may accept a command from a user to designate a type of an object to be added to the label image being currently edited. The type of the object may include, for example, text, frame, figure, picture, and barcode.

The information processing apparatus 2 accepting the command to add an object adds an area to accept the designated object in the preview image 501. Further, the information processing apparatus 2 may accept designation of the image data for the image to be printed and display the image by the designated image data in the added object area in the preview image 501. In FIG. 4, the preview image 501 including a text object 501a, which contains characters XYZ, and a figure object 501b, which represents a flower, is displayed.

A part of the preview image 501 in the editor screen 50 may be defined as a printing range. The printing range may contain an image to be printed and may be defined by printing conditions, such as a width of a label to be used in the image printing or a size of a printing sheet. The information processing apparatus 2 may display the preview image 501 with indication of the printing range. The information processing apparatus 2 may accept a user's operation to a printing range button 506 to set the range for the image to be printed in the preview image 501. A user may, for example, place an object outside the printing range in the preview image 501 in order to, for example, efficiently create a label image. In such a case, by limiting the printable area in the preview image 501, the object, which should not be printed, may be excluded from the printing range and prevented from being printed undesirably. In the preview image 501 shown in FIG. 4, a printing range 506a containing a text object 501a and excluding a figure image 501, is indicated in a dash-and-dot line.

The information processing apparatus 2, while running the image-editor application 41 active, may accept a user's operation to the print button 502 in the editor screen 50. In response, the information processing apparatus 2 may display a basic setting screen 51, through which print settings may be entered, as shown in FIG. 5. In response to the user's operation through the basic setting screen 51, the information processing apparatus 2 may accept basic settings such as a number of copies 511 and a cutting option 512 for the printed label.

The basic setting screen 51 may further include, as shown in FIG. 5, an advanced setting button 52, a cancel button 53, and a print start button 54. The cancel button 53 may be operated to cancel image printing. The print start button 54 may be operated to start printing. The advanced setting button 52 may be operated to apply more advanced or detailed settings to the image printing. The information processing apparatus 2 accepting a user's operation to the advanced setting button 52 may display, for example, an advanced setting screen 55 as shown in FIG. 6, which shows options prepared for more advanced settings than the settings applicable through the basic setting screen 51.

FIG. 6 shows an illustrative view of an advanced setting screen 55A, which contains a plurality of displayable setting items, including all of the prepared options that may be presented to the user and selectable by the user to be applied to the image printing. Through the advanced setting screen 55A, as shown in FIG. 6, for example, options concerning a print quality setting 551, a print start setting 552, a halftone setting 553, a brightness/contrast settings 554, and a bidirectional communication setting 555, may be presented.

Specifically, in the advanced setting screen 55A as shown in FIG. 6, the print quality setting 551 being one of the displayable setting items may provide three (3) applicable options: priority on speed, 300 by 300 dpi; priority on quality, 300 by 300 dpi; and high resolution, 300 by 600 dpi. The print start setting 552 being another one of the displayed items may provide two (2) applicable options concerning a timing to start printing: "start printing as soon as the printer starts receiving data"; and "start printing when the printer receives data for one page." The halftone setting 553 being another one of the displayed items may provide three (3) options: optimized for logo/text, optimized for text/graphics, and optimized for general label including an image. The brightness/contrast settings 554 being another one of the displayable setting items may provide a slider bar for brightness setting and a slider bar for contrast setting.

The information processing apparatus 2 may obtain a type of an object, i.e., a type of an image to be printed, contained in the printing range and determine a combination of displayable options as applicable print settings to be displayed in the advanced setting screen 55. In this regard, for example, an option, which may not cause substantial difference in a printed image, may be eliminated from the displayable options. Meanwhile, an option, which may substantially affect appearance in the printed image, may be determined as a displayable option.

For example, an image to be printed may contain a multicolored picture object. The information processing apparatus 2 may display the advanced setting screen 55A, which shows all of the prepared options, and accept the user's selections to one of the options for each setting item. For example, a user may wish to print an image in a high resolution and select the option "high resolution, 300 by 600 dpi" in the print quality setting 551. In response, the information processing apparatus 2 may transmit print data with a print command, which designates the high resolution, to the printing apparatus 1.

Figure 7:
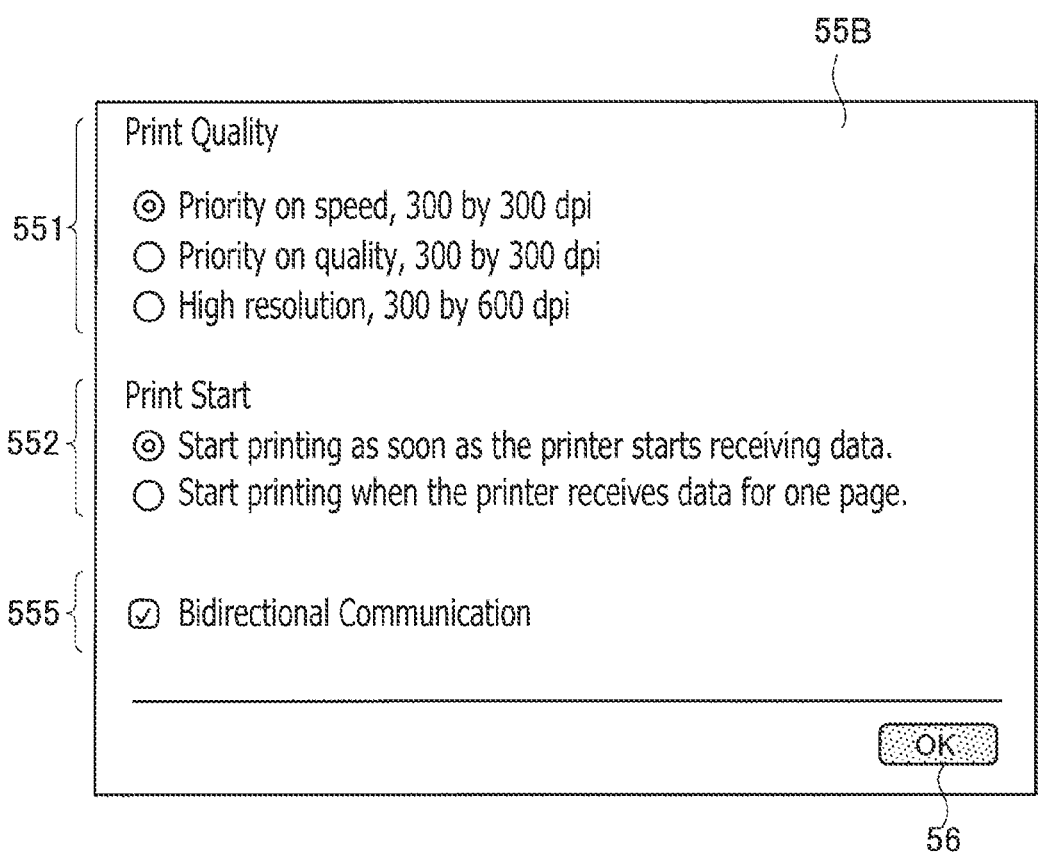
FIG. 7 is an illustrative view of an advanced setting screen to be displayed in the information processing apparatus s according to the embodiment of the present disclosure.

For another example, the image to be printed may contain text objects alone. The information processing apparatus 2 may display another advanced setting screen 55B, for example, as shown in FIG. 7. The advanced setting screen 55B may present the displayable settings items including the print quality setting 551, the print start setting 552, the bidirectional communication setting 555, and the prepared options therefore. Meanwhile, the other setting items, the halftone setting 553, the brightness/contrast settings 554, and the prepared options therefore may not be contained in the advanced setting screen 55B.

When, for example, the objects contained in the image to be printed are text objects alone, the option "optimized for logo/text" may be preferably adopted for the halftone setting 553. For another example, in an image containing a single-colored object alone, adjustment of color tones in the brightness/contrast settings 554 may not substantially affect appearance of the printed image. In this regard, concerning the setting items such as the halftone setting 553 and the brightness/contrast settings 554, it may not be necessary to receive advanced settings options from the user. Therefore, when the image to be printed contains text object(s) alone, the information processing apparatus 2 may display the advanced setting screen 55B without the options for the halftone setting 553 or the brightness/contrast settings 554. However, if the printing apparatus 1 has an ability to print an image, of which appearance is substantially affected by the options for the single-colored object, the information processing apparatus 2 may display the options for the brightness/contrast settings 554.

An image to be printed may contain a plurality of different-typed objects, and the information processing apparatus 2 may determine a combination of the options to be displayed based a combination of the types of the objects. For example, the information processing apparatus 2 may display the same advanced setting screen 55B both when the image to be printed contains a single text object and when the image to be printed contains a plurality of text objects. Meanwhile, when, for example, the image to be printed contains a plurality of objects, and at least one of the objects is a picture object, the information processing apparatus 2 may display the advanced setting screen 55A.

The advanced setting screen 55 further contains an OK button 56, as shown in FIGS. 6 and 7, which may be operated by the user to close the advanced setting screen 55. When the OK button 56 is operated, the information processing apparatus 2 may switch screens from the advanced setting screen 55 to the basic setting screen 51 and accept operations by the user to the basic setting screen 51.

Figure 8:
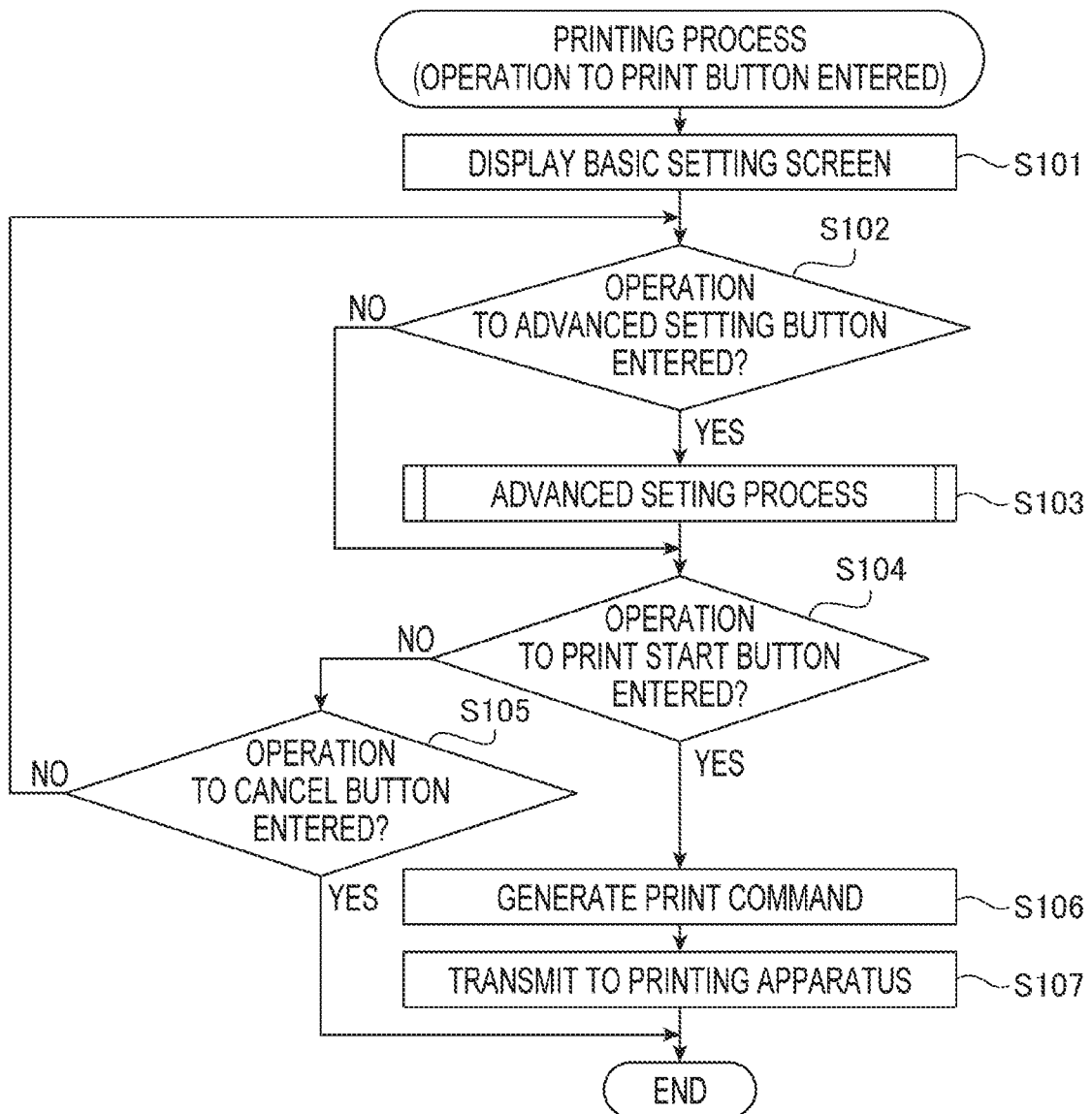
FIG. 8 is a flowchart to illustrate flows of steps in a printing process in the information processing apparatus according to the embodiment of the present disclosure.

Next, in the following paragraphs, with reference to FIG. 8, described will be flows of steps in the printing process to be conducted by the information processing apparatus 2 in order to implement the printing actions in the printing system 100 described earlier. The printing process may be conducted by the CPU 21 in the information processing apparatus 2 in response to receiving a print command in the active image-editor application 41, in other words, in response to accepting a user's operation to the print button 502 through the editor screen 50.

As the CPU 21 accepts the print command through the image-editor application 41, in S101, the CPU 21 displays the basic setting screen 51 (see FIG. 5). In S102, the CPU 21 determines whether a user's operation to the advanced setting button 52 in the basic setting screen 51 is entered. In S102, if the user's operation to the advanced setting button 52 is entered (S102: YES), in S103, the CPU 21 conducts an advanced setting process to determine the displayable setting items to be displayed in the advanced setting screen 55.

Flows of steps in the advanced setting process will be described below with reference to a flowchart in FIG. 9. In S201, the CPU 21 obtains information concerning each object contained in the printing range from the image data contained in the label image file designated by the print command received through the image-editor application 41. The printing range may either be a physically printable range or a range defined by the user. The CPU 21 conducts the following steps to the objects contained in the limited printing range.

As mentioned above, the object(s) that may be considered in order to determine the displayable setting items and the options to be displayed are limited to those contained in the printing range so that the more preferable or effective options depending on the objects to be printed may be collected. Moreover, the advanced setting process is applied to the data in the label image file at the moment when the print command was received. Therefore, the advanced settings may be applied to the image data at the point immediately before the basic setting screen 51 is displayed.

In S202, the CPU 21 obtains type(s) of the object(s) obtained in S201. In S203, the CPU 21 conducts a displayable setting item determining process to determine the displayable setting items in the advanced setting screen 55 based on the type(s) of the object(s).

The displayable setting item determining process in S203 may be conducted as a part of actions conducted by the CPU 21 in accordance with the image-editor application 41. In other words, the CPU 21 may obtain the object type(s) and conduct the displayable setting item determining process based on the obtained object type(s) as actions in the processes by the image-editor application 41.

Alternatively, the displayable setting item determining process in S203 may be conducted as a part of actions conducted in accordance with the specialized print-controlling program 43. If the displayable setting item determining process in S203 is conducted as a part of the actions conducted in accordance with the specialized print-controlling program 43, the CPU 21 may pass the information concerning the object(s) from the image-editor application 41 to the specialized print-controlling program 43 and return a processed outcome in the displayable setting item determining process from the specialized print-controlling program 43 to the image-editor application 41. Thus, when, for example, the printing apparatus 1 to be used is switched to another printing apparatus 1, and if the options for the displayable setting items may need to be changed, solely the specialized print-controlling program 43 may be updated, and the image-editor application 41 may not necessarily be updated.

Figure 10:
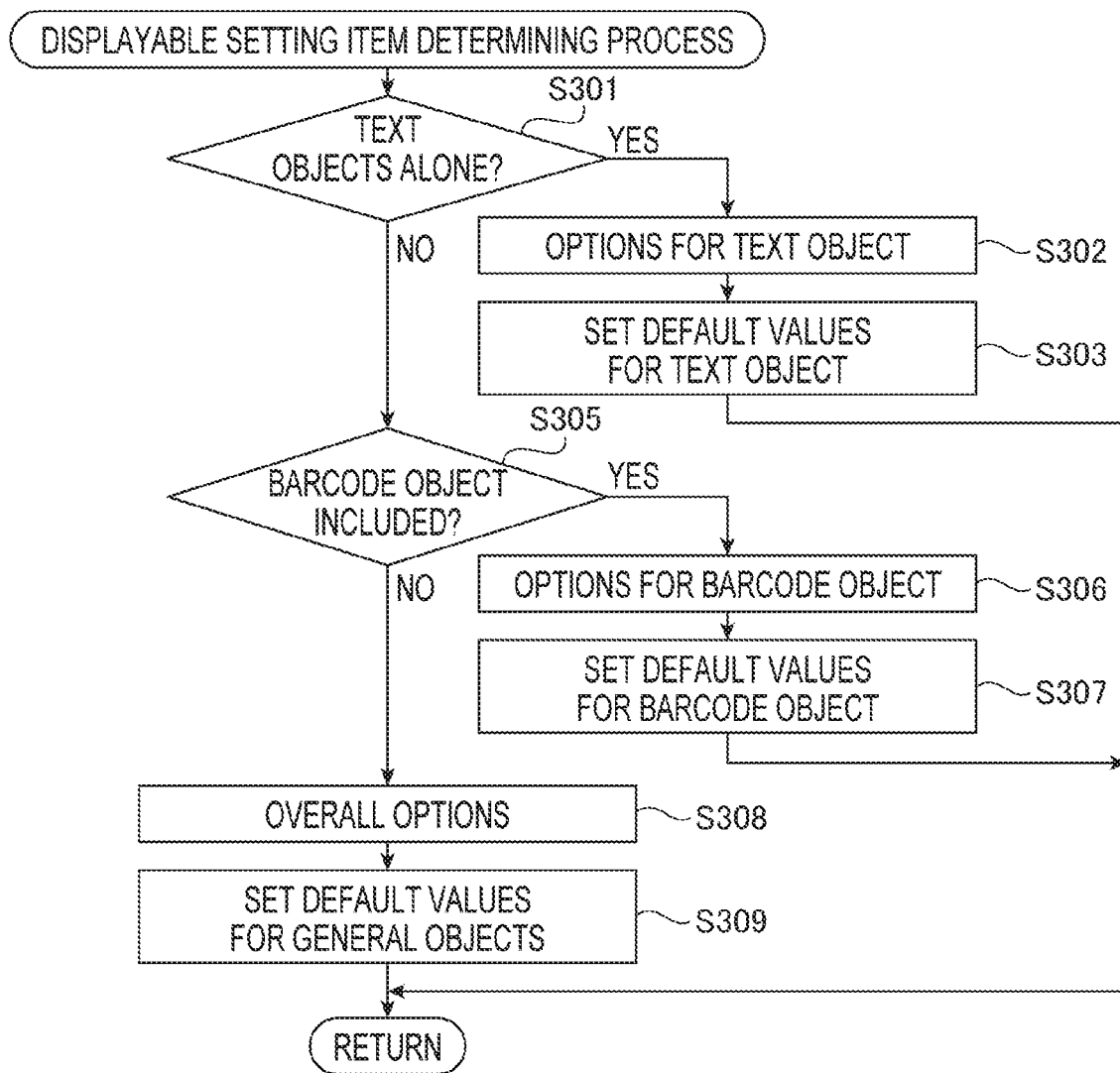
FIG. 10 is a flowchart to illustrate flows of steps in a displayable settings items determining process in the information processing apparatus according to the embodiment of the present disclosure.

Next, in the following paragraphs, with reference to FIG. 10, described will be flows of steps in the displayable setting item determining process in S203 to be conducted by the information processing apparatus 2. The displayable setting item determining process may be a part of the processes conducted by the CPU 21 in accordance with the image-editor application 41.

As the displayable setting item determining process starts, in S301, the CPU 21 determines whether the type of the objects obtained in S202 contain no other object type but text object. In other words, the CPU 21 determines whether the type(s) of the object(s) falls under the text type alone. If the type(s) of the object(s) falls under the text object alone (S301: YES), in S302, the CPU 21 determines that the options optimized for text object will be displayed. In particular, the CPU 21 may determine appearance of the advanced setting screen 55 to be the advanced setting screen 55B as shown in FIG. 7, in which the setting items "halftone setting 553" and "brightness/contrast settings 554" are omitted. A quantity of the options to be displayed in the advanced setting screen 55B are smaller than a quantity of the options to be displayed in the advanced setting screen 55A (see FIG. 6).

A printed image of a text object may not require advanced color-tone settings; therefore, by omitting the options for the setting items concerning the color-tone settings, the setting screen may be simplified, it may be easier for the user to select preferable options among the displayed options. In other words, with regard to the setting items that may not affect the printed outcome, the image-editor application 41 may not accept alteration of the settings by the user. Meanwhile, for the setting item that is not displayed, the CPU 21 may adopt a default value. The CPU 21 may, for example, adopt an option "optimized for general label including image" for the halftone setting 553 and zero (0) for brightness and contrast in the brightness/contrast settings 554.

In S303, the CPU 21 adopts default values preset for text object for the setting items to be displayed. In particular, the CPU 21 may display the print quality setting 551 with one of the options therefor, e.g., "priority on speed, 300 by 300 dpi," being adopted and the print start setting 551 with one of the options therefor, e.g., "start printing as soon as the printer starts receiving data," being adopted.

In a case where the types of the objects to be printed fall under the text type alone, the setting items "image quality setting" and/or "print start setting" may be removed from the advanced setting screen 55 as well. In other words, none of the options for the setting items may be displayed. When none of the options is displayed, the advanced setting button 52 may be omitted from the basic setting screen 51. Moreover, not only when the types of the objects fall under the text type alone, but also when the types of the objects fall under one the text type and the figure type alone, or merely the figure type alone, an affirmative determination (S301: YES) may be made.

In S301, on the other hand, if the CPU 21 determines that the types of the objects obtained in S202 fall under an object type other than the text type (S301: NO), in S305, the CPU 21 determines whether the types of the objects includes the barcode type. If the CPU 21 determines that the types of the objects include the barcode type (S305: YES), in S306, the CPU 21 determines that the options optimized for barcode object will be displayed. In particular, the CPU 21 may display, for example, the option "high resolution, 300 by 600 dpi" alone and omit displaying the other options for the print quality setting 551.

If an image containing a barcode object is printed with a resolution setting adopting an option other than high resolution as the print quality setting, the barcode may not be printed in a preferable appearance to be correctly read by commonly used barcode readers. Therefore, when the image to be printed contains a barcode object, the information processing apparatus 2 fixes the option for the print quality setting 551 to the high resolution and may not accept alteration of the resolutions by the user. Thereby, a correctly readable barcode may be printed. The barcode mentioned in the present description may include QR code (registered trademark) and specialized codes designed for specific purposes.

In S307, the CPU 21 adopts default values preset for barcode object for the setting items to be displayed. In particular, the CPU 21 may display the print start setting 551 with one of the options therefor, e.g., "start printing as soon as the printer starts receiving data," being adopted and the halftone setting 553 with one of the options therefor, e.g., "optimized for logo/text," being adopted.

Alternatively, in S307, rather than displaying the option "high resolution, 300 by 600 dpi" alone, in other words, rather than omitting the options other than "high resolution, 300 by 600 dpi," the CPU 21 may display the other options in a form inoperable by the user. For example, the other options may be displayed in gray. Moreover, when the object type includes the barcode type alone, options to be displayed may be reduced further. For example, the brightness/contrast settings 554 may be omitted from the advanced setting screen 55.

In S305, meanwhile, if the CPU 21 determines that no barcode type is included in the object types (S305: NO), in S308, the CPU 21 determines that all of the options prepared for the displayable items will be displayed. In particular, the CPU 21 may determine the advanced setting screen 55 to be displayed to the advanced setting screen 55A, as shown in FIG. 6, in which all of the options are presented. In S309, the CPU 21 adopts default values preset for general label including image for the setting items to be displayed.

For example, the types of the objects in the image to be printed may include the picture type but may not include the barcode type. In this case, in S305, a negative determination may be made in S305 (S305: NO), and all of the options may be displayed to be selectable. The information processing apparatus 2 may, for example, accept both a print setting with the priority on speed and a print setting in the high resolution. Thus, as all of the options are presented to be selectable, a wider range of settings may be available to the user.

Meanwhile, a default value for each print setting item may vary depending on, not only the type of the object, but also on a volume of the image data. In this regard, the CPU 21 may adopt a default value for each print setting item on basis of a volume of the image data. For example, for the image data is in a large volume, the option "start printing as soon as the printer starts receiving data" may be set as a default value for the print start setting 552. In the setting "start printing as soon as the printer starts receiving data," the information processing apparatus 2 may transmit the image data to the printing apparatus 1 in a compressed form; therefore, the image data may be transmitted promptly to the printing apparatus 1 even though the data volume is large. On the other hand, for image data in a smaller volume, the option "start printing as soon as the printer starts receiving data" may be set as a default value for the print start setting 552, while the image data in the smaller volume may be transmitted in a shorter time so that image printing may be started promptly.

Figure 9:
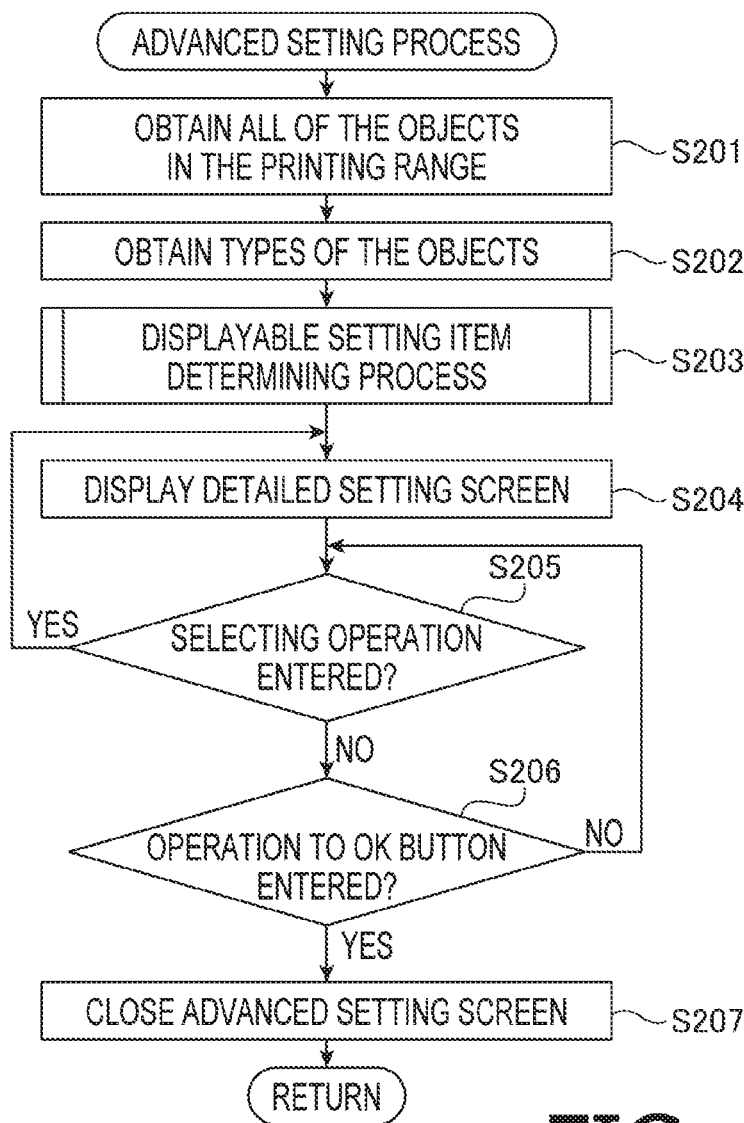
FIG. 9 is a flowchart to illustrate flows of steps in an advanced setting process in the information processing apparatus according to the embodiment of the present disclosure.

After S303, S307, or S309, that is, after determining the displayable setting items and the default values for the setting items, the CPU 21 exits the displayable item determining process and returns to the advanced setting process (see FIG. 9).

In S204 in the advanced setting process, the CPU 21 controls the operation/display interface 26 and displays the advanced setting screen 55 based on the displayable setting items and the default values determined in the displayable setting item determining process in S203. The advanced setting screen 55 may be displayed partly or entirely over the basic setting screen 51.

In S205, the CPU 21 determines whether a selecting operation by the user to the options displayed in the advanced setting screen 55 is entered. If the CPU 21 determines that a selecting operation by the user is entered (S205: YES), the CPU 21 returns to S204 and displays the advanced setting screen 55 based on the displayable setting items and the values selected by the user's operations.

In S205, if the CPU 21 determines that no selecting operation by the user is entered (S205: NO), in S206, the CPU 21 determines whether a user's operation to the OK button 56 in the advanced setting screen 55 is entered. If the CPU 21 determines that no operation to the OK button 56 is entered (S206: NO), the CPU 21 returns to S205 and waits until either the user's selecting operation or the operation to the OK button 56 is entered.

In S206, on the other hand, if the CPU 21 determines that a user's operation to the OK button 56 is entered (S206: YES), in S207, the CPU 21 stores the advanced settings entered and controls the operation/display interface 26 to close the advanced setting screen 55. Thereafter, the CPU 21 exits the advanced setting process. As the advanced setting screen 55 is closed, the basic setting screen 51 is enabled to accept a user's operation thereto. The flow returns to the printing process as shown in FIG. 8.

In the printing process, returning to FIG. 8, following S103, in S104, the CPU 21 determines whether a user's operation to the print start button 54 is entered through the basic setting screen 51. If the CPU 21 determines that no operation to the print start button 54 is entered (S104: NO), in S105, the CPU 21 determines whether a user's operation to the cancel button 53 is entered. If the CPU 21 determines that no operation to the cancel button 53 is entered (S105: NO), the CPU 21 returns to S102 and waits until an operation to any one of the advanced setting button 52, the cancel button 53, and the print start button 54 is entered.

In S104, if the CPU 21 determines that a user's operation to the print start button 54 is entered (S104: YES), in S106, the CPU 21 generates a print command containing the image data to be printed and the print settings having been adopted. The CPU 21 may transfer the image data to the specialized print-controlling program 43 and generate rasterized data with the print settings reflected therein through the processes in the specialized print-controlling program 43.

In S107, the CPU 21 transmits the generated print command to the printing apparatus 1 and ends the printing process. Meanwhile, the printing apparatus 1 receiving the print command may print the image according to the image data and the settings in the print command. In S105, on the other hand, if the CPU 21 determines that a user's operation to the cancel button 53 is entered (S105: YES), the CPU 21 ends the printing process.

As described above, according to the printing system 100 in the present embodiment, the information processing apparatus 2 may obtain the types of the objects contained in the image file of the image to be printed and determine the options for the print settings which are selectable depending on the objet types. Therefore, the quantity of the options may be increased or reduced depending on the content of the image file, and the options, which may not substantially affect the printed outcome of the image, may be omitted from being presented to the user. As a result, appearance of the print setting screen may be simplified, and usability of the information processing apparatus 2 to the user may be improved. It may be noted that the quantity of the options to be increased or reduced may include a quantity of the print setting items and a quantity of the options for each print setting item.

Although an example of carrying out the invention has been described, those skilled in the art will appreciate that there are numerous variations and permutations of the program to be run in the information processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the printing apparatus 1 may not necessarily be equipped with the operation panel 13. For another example, the memory medium in the information processing apparatus 2 may not necessarily be limited to the non-volatile memory 24 but may be any type of mass storage memory device.

For another example, the printing apparatus 1 may not necessarily be a multicolor printer but may be a monochrome printer. In a case where the printing apparatus 1 is a monochrome printer, the information processing apparatus 2 may omit to display options concerning color settings regardless of a type of an object in an image to be printed.

For another example, the communication method between the printing apparatus 1 and the information processing apparatus 2 may not necessarily be limited to the wireless communication in compliance with the Wi-Fi standard but may be, for example, wired communication through a USB cable or wireless communication in compliance with Bluetooth (registered trademark). Further, the printing apparatus 1 and the information processing apparatus 2 may be adapted to a plurality of communication methods.

For another example, the image file for the image to be printed may not necessarily be limited to the label image file for printing a label on a tape. For example, the image file may be a compressed file including a PDF file, a JPEG file, etc., or may be a bitmap file. When the image file other than the label image file is used, an application program and a print-controlling program that may handle the image data equivalently to the image-editor application 41 and the specialized print-controlling program 43 may be adopted.

For another example, the second channel may not necessarily require rasterization in the printing apparatus 1; in other words, rasterization may be conducted in the information processing apparatus 2, as long as the second channel provides a processing channel different from the first channel. For example, if the basic print-controlling program 45 has the rasterizing function, the basic print-controlling program 45 may rasterize the image data by its own rasterizing function. In this configuration, the first channel and the second channel still differ in algorisms for the rasterization. In this configuration, further, while the first channel is a channel, which does not use the print-controlling function provided by the OS 44, and the second channel is a channel, which uses the print-controlling function provided by the OS 44.

For another example, the processing channels in the printing system 100 may not necessarily be limited to the first channel and the second channel, but the printing system 100 may have three or more channels. For example, the printing system 100 may have a channel, in which an image may be printed by a driver specialized to the device, and, a channel, in which an image may be printed by CUPS being a printer driver for UNIX (registered trademark), macOS (registered trademark), and Linux (registered trademark). The device-specific driver and CUPS are programs embedded in the OS 44 (see FIG. 2) in the information processing apparatus 2 to rasterize image data. With these additional processing channels, if errors occur in both the first channel and the second channel, the image printing may be retried through these additional processing channels.

For another example, when an image to be printed contains a barcode object, the preset option "high resolution" for the print quality setting 551 may not necessarily be displayed but may be omitted from the advanced setting screen 55. Without displaying the preset option "high resolution," the quantity of the options to be displayed may be further reduced, and the user may handle the print settings more easily. On the other hand, displaying the preset option "high resolution" may help the user to understand that the option "high resolution" will be applied more clearly.

For another example, the object types may not necessarily be limited to those cited above but may include more or fewer object type(s). For another example, the object types to be obtained may not necessarily be limited to the types of the objects contained in the printing range but may include types of all the objects contained in the image file. Meanwhile, when the object types to be obtained is limited to the types of the objects contained in the printing range, the processes to determine the displayable setting items and the options therefore to be displayed may be reduced. For another example, the default value preset for each setting may not necessarily be changed depending on the object types but may be fixed regardless of the object types. Meanwhile, changing the default values depending on the object types may be more beneficial to users.

For another example, the processes to display the basic setting screen 51 and the advanced setting screen 55 to accept selecting operations from the user may not necessarily be conducted as parts of the processes in the image-editor application 41 but may be conducted as parts of processes in the specialized print-controlling program 43. In the case where the processes to display the basic setting screen 51 and the advanced setting screen 55 to accept selecting operations from the user are conducted as parts of processes in the specialized print-controlling program 43, the CPU 21 may pass the information concerning the image data from the image-editor application 41 to the specialized print-controlling program 43, and the options to be displayed may be determined through the specialized print-controlling program 43. The specialized print-controlling program 43 may accept the user's selected options and pass the selected options to the image-editor program 41.

For another example, the image data of the image to be printed in the printing system 1 may not necessarily be processed through the first channel but may be processed through the second channel. When the image data is processed through the second channel, the information processing apparatus 2 may, for example, determine the options to be displayed among the options that are feasible to the second channel. The information processing apparatus 2 may, for another example, query the basic print-controlling program 45 about the feasible options and may omit displaying options infeasible to the second channel so that the usability to the user may be improved.

For another example, the processing channel to print an image may be determined based on a user's instruction or may be determined automatically based on printing conditions such as a model of the designated printing apparatus 1, a format of the image to be printed, etc. The information processing apparatus 2 may, for example, determine the first channel to be the processing channel when a model of the designated printing apparatus 1 is feasible to the first channel but is not feasible to the second channel and may conduct the printing process. On the other hand, the information processing apparatus 2 may determine the second channel to be the processing channel when the model of the designated printing apparatus 1 is feasible to the second channel but is not feasible to the first channel and may not conduct the printing process. When a model of the designated printing apparatus 1 is feasible to both the first channel and the second channel, the information processing apparatus 2 may determine the processing channel based on a type of an object in the image to be printed. For example, when the image to be printed contains a barcode object (S305: YES), the information processing apparatus 2 may determine the first channel, through which the image may be printed in the high resolution, to be the processing channel. For another example, when the image to be printed contains text object (s) alone, the information processing apparatus 2 may determine the second channel to be the processing channel. For example, in the displayable setting item determining process, following S303, a step to alter the processing channel from the first channel to the second channel may be added, and, when an affirmative determination is made in S301 (S301: YES), the CPU 21 may alter the processing channel from the first channel to the second channel.

For another example, the steps or the processes in the printing process described above may be accomplished by a single CPU, a plurality of CPUs, a hardware device such as an ASIC, or a combination of any of these. For another example, the steps or the processes in the above-described embodiment may be accomplished by various media or methods, including a recording medium storing the programs to implement the steps or the processes.

What is claimed is:

1. A non-transitory computer readable storage medium storing computer readable instructions that are executable by a computer in an information processing apparatus comprising a communication interface, through which the information processing apparatus is connected with a printer,
   wherein a first processing channel and a second processing channel are formed between the information processing apparatus and the printer through the communication interface, and
   wherein the computer readable instructions, when executed by the computer, cause the information processing apparatus to:
   obtain a type of an object contained in an image file;
   determine whether the obtained type of the object is a first type; and
   based on a determination that the obtained type of the object is the first type, determine the first processing channel to be used to process image data included in the image file for an image to be printed by the printer, and based on a determination that the obtained type of the object is a second type different from the first type, determine the second processing channel to be used to process the image data included in the image file for the image to be printed by the printer.

2. The non-transitory computer readable storage medium according to claim 1,
   wherein, based on the determination that the obtained type of the object is the first type, the computer readable instructions cause the information processing apparatus to determine a combination of applicable options for print settings for the image file to be a first option group, and based on the determination that the obtained type of the object is the second type, the computer readable instructions cause the information processing apparatus to determine the combination of applicable options for the print settings for the image file to be a second option group.

3. The non-transitory computer readable storage medium according to claim 2,
   wherein the second option group contains a smaller number of the applicable options than the first option group.

4. The non-transitory computer readable storage medium according to claim 2,
wherein the first option group is a combination of options applicable for the print settings for the image file to be processed through the first processing channel but inapplicable for the print settings for the image file to be processed through the second processing channel.

5. The non-transitory computer readable storage medium according to claim 2,
wherein the computer readable instructions cause the information processing apparatus to determine the combination of the applicable options for the print settings between the first option group and the second option group under a condition where the first processing channel is determined to be used to process the image data.

6. The non-transitory computer readable storage medium according to claim 1,
wherein an operating system in the information processing apparatus includes a print controlling function,
wherein the first processing channel is a channel to cause the printer to print the image without using the print controlling function, and
wherein the second processing channel is a channel to cause the printer to print the image by use of the print controlling function.

7. The non-transitory computer readable storage medium according to claim 1,
wherein the first processing channel is a channel to process the image data for the image to be printed by the printer through a first rasterization process, and
wherein the second processing channel is a channel to process the image data for the image to be printed by the printer through a second rasterization process, the second rasterization process being different from the first rasterization process.

8. The non-transitory computer readable storage medium according to claim 1,
wherein the first processing channel is a channel, through which the computer readable instructions cause the information processing apparatus to rasterize the image data, and
wherein the second processing channel is a channel, through which the computer readable instructions cause the printer to rasterize the image data.

9. An information processing apparatus, comprising:
a communication interface, through which the information processing apparatus is connected with a printer, and through which a first processing channel and a second processing channel are formed between the information processing apparatus and the printer; and
a controller configured to:
obtain a type of an object contained in an image file;
determine whether the obtained type of the object is a first type; and
based on a determination that the obtained type of the object is the first type, determine the first processing channel to be used to process image data included in the image file for an image to be printed by the printer, and based on a determination that the obtained type of the object is a second type different from the first type, determine the second processing channel to be used to process the image data included in the image file for the image to be printed by the printer.

10. A method implementable on a processor coupled with an information processing apparatus, the information processing apparatus comprising a communication interface, through which the information processing apparatus is connected with a printer, and through which a first processing channel and a second processing channel are formed between the information processing apparatus and the printer, the method comprising:
obtaining a type of an object contained in an image file;
determining whether the obtained type of the object is a first type; and
based on a determination that the obtained type of the object is the first type, determining the first processing channel to be used to process image data included in the image file for an image to be printed by the printer, and based on a determination that the obtained type of the object is a second type different from the first type, determining the second processing channel to be used to process the image data included in the image file for the image to be printed by the printer.

\* \* \* \* \*